United States Patent
Weaver

(10) Patent No.: US 10,337,783 B2
(45) Date of Patent: Jul. 2, 2019

(54) CARRY BAG WITH INSULATED MEDICINE COMPARTMENT AND RELATED METHODS

(71) Applicant: Abigail Weaver, Jacksonville, AR (US)

(72) Inventor: Abigail Weaver, Jacksonville, AR (US)

(*) Notice: Subject to any disclaimer, the term of this patent is extended or adjusted under 35 U.S.C. 154(b) by 0 days.

(21) Appl. No.: 15/485,610

(22) Filed: Apr. 12, 2017

(65) Prior Publication Data
US 2017/0292757 A1    Oct. 12, 2017

Related U.S. Application Data

(60) Provisional application No. 62/321,469, filed on Apr. 12, 2016.

(51) Int. Cl.
| | | |
|---|---|---|
| *A61J 1/16* | (2006.01) | |
| *F25D 3/08* | (2006.01) | |
| *H04W 4/80* | (2018.01) | |
| *F25D 29/00* | (2006.01) | |

(52) U.S. Cl.
CPC .......... *F25D 3/08* (2013.01); *A61J 1/165* (2013.01); *F25D 29/003* (2013.01); *F25D 2331/8014* (2013.01); *F25D 2700/121* (2013.01); *H04W 4/80* (2018.02)

(58) Field of Classification Search
CPC ....... F25D 2331/8014; F25D 2331/801; F25D 3/08; F25D 3/06; F25D 3/00; F25D 2700/121; F25D 2303/084; F25D 2303/0843; F25D 11/003; H04W 4/80; G06F 1/00; G06F 11/3058; A61J 2200/72; A61J 1/165

USPC ...... 62/371, 372, 457.1, 457.2, 457.5, 457.7
See application file for complete search history.

(56) References Cited

U.S. PATENT DOCUMENTS

| | | | | |
|---|---|---|---|---|
| 5,865,314 A | * | 2/1999 | Jacober | A61J 1/165 150/117 |
| 6,253,570 B1 | * | 7/2001 | Lustig | A45C 15/00 62/125 |
| 2005/0081297 A1 | * | 4/2005 | Woodward | A47D 5/006 5/655 |
| 2007/0028642 A1 | * | 2/2007 | Glade | A45C 11/20 62/371 |
| 2009/0320516 A1 | * | 12/2009 | Kanagaki | A45C 15/00 62/457.2 |
| 2011/0314608 A1 | * | 12/2011 | Rovin | A47D 5/006 5/655 |
| 2013/0344806 A1 | * | 12/2013 | Pai | H04R 25/554 455/41.1 |

(Continued)

*Primary Examiner* — Joseph F Trpisovsky

(57) ABSTRACT

A system may include a mobile wireless device and a carry bag. The carry bag may include a pouch having an opening therein, at least one divider within the pouch defining a medical container compartment and a storage compartment, insulation lining the medical container compartment, a temperature sensor carried by the pouch and configured to monitor temperature within the medical container compartment, a wireless transceiver carried by the pouch, and a processor carried by the pouch and cooperating with the temperature sensor and the wireless transceiver to send temperature data to the mobile wireless device. The mobile wireless communications device may be configured to generate an alert when the temperature within the medical container compartment is outside of safe storage temperature range.

20 Claims, 4 Drawing Sheets

(56) References Cited

U.S. PATENT DOCUMENTS

2014/0368346 A1* 12/2014 Paydar .................. G01K 3/005
340/585

* cited by examiner

CARRY BAG WITH INSULATED MEDICINE COMPARTMENT AND RELATED METHODS

RELATED APPLICATIONS

This application claims the benefit of provisional application Ser. No. 62/321,469 filed Apr. 12, 2016, which is hereby incorporated herein in its entirety by reference.

TECHNICAL FIELD

The present disclosure relates to bags, such as travel or carry bags, which may include a compartment for carrying medical supplies and related methods.

BACKGROUND

Carry bags are useful for many applications, such as travel, work, and in the case of children, for accessories such as diapers, snacks, toys, etc. However, in some cases travelers or children may require special medicines, such as insulin, adrenaline, etc., that require temperature control or should not be exposed to sunlight for extended periods. Typically these specialized items are carried in a dedicated pouch or bag. While this keeps the items stored properly, it adds additional baggage to keep track of when transporting other items and accordingly may be cumbersome in some circumstances.

SUMMARY

A system may include a mobile wireless device and a carry bag. The carry bag may include a pouch having an opening therein, at least one divider within the pouch defining a medical container compartment and a storage compartment, insulation lining the medical container compartment, a temperature sensor carried by the pouch and configured to monitor temperature within the medical container compartment, a wireless transceiver carried by the pouch, and a processor carried by the pouch and cooperating with the temperature sensor and the wireless transceiver to send temperature data to the mobile wireless device. The mobile wireless communications device may be configured to generate an alert when the temperature within the medical container compartment is outside of safe storage temperature range.

DETAILED DESCRIPTION

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete.

Figure 1:
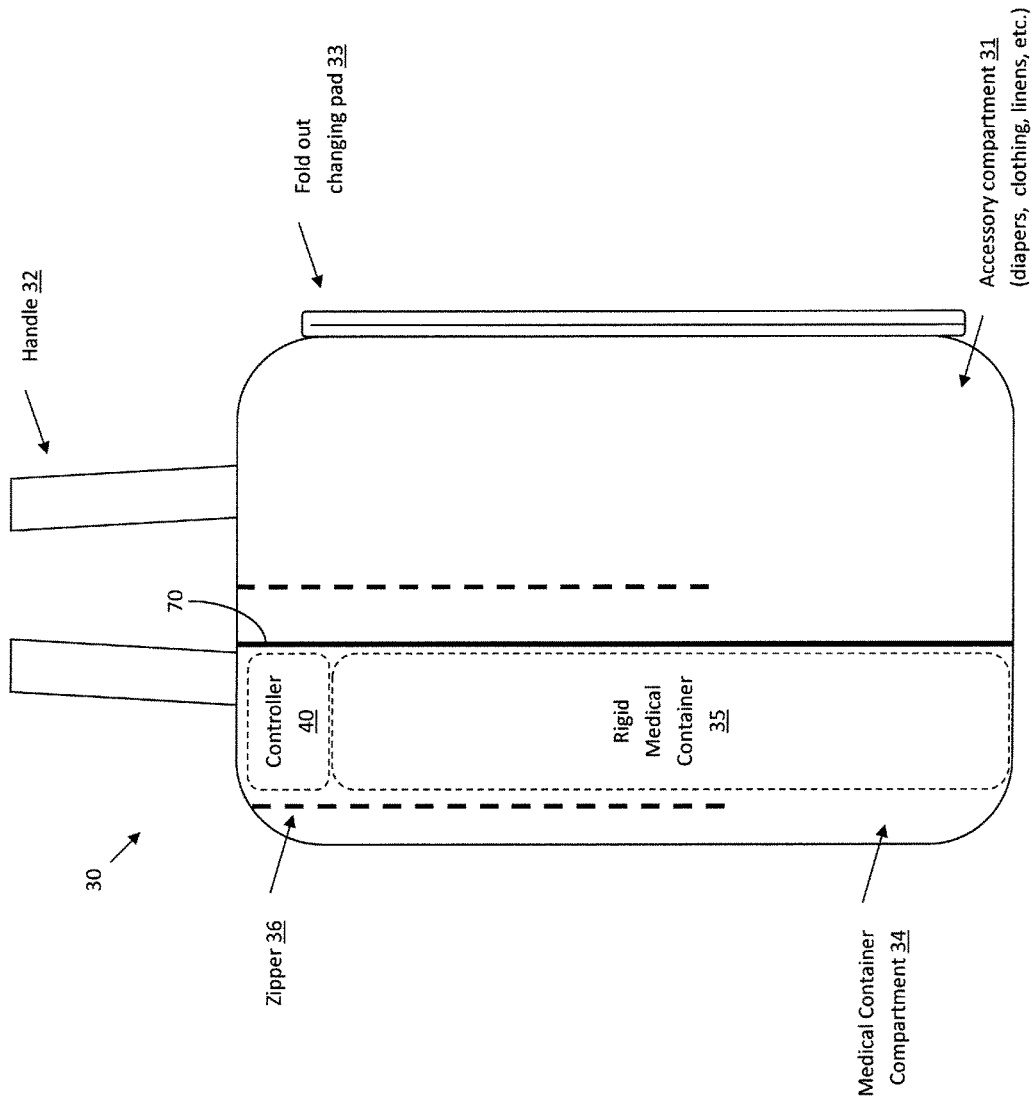
FIG. 1 is a side view of a carry bag including a compartment and associated rigid medical container therein in accordance with an example embodiment.
Figure 2:
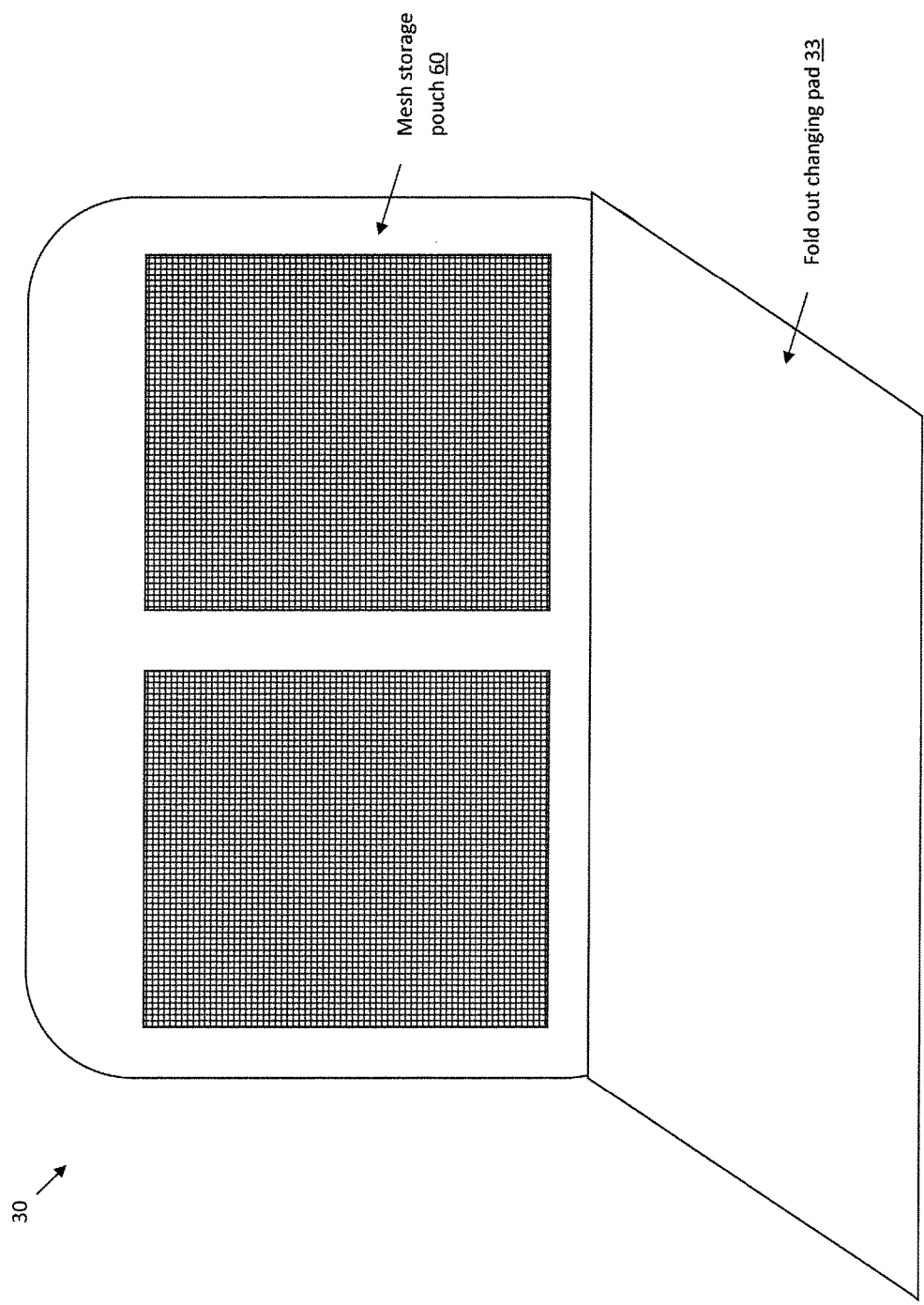
FIG. 2 is a front view of the carry bag of FIG. 1 with a pad in a folded out position and illustrating additional storage pouches of the carry bag.
Figure 3:
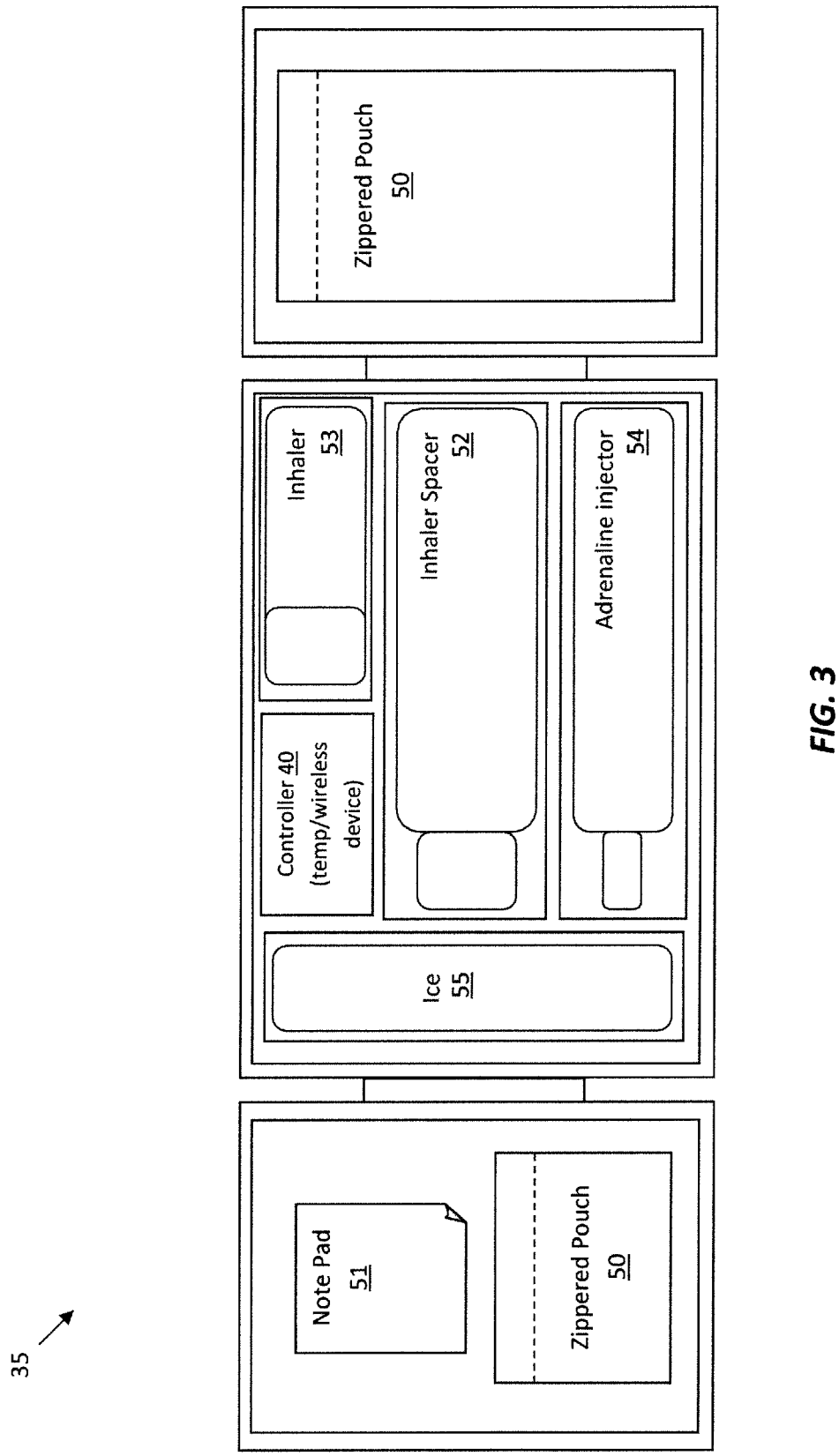
FIG. 3 is a top view of the rigid medical container of the carry bag of FIG. 1 outside of the carry bag and with a two-part lid opened to reveal the contents of the rigid medical container therein in accordance with an example embodiment.

Referring initially to FIGS. 1-3, a travel or carry bag 30 in accordance with an example embodiment is now described. In the illustrated example, the bag 30 is a "diaper bag" which includes an accessory compartment 31 which child care accessories such as diapers, clothing, linens, lotions, etc., may be stored. However, in other embodiments the bag 30 or case may take different forms, such as a briefcase, purse, luggage bag, computer case, etc. The bag 30 may be made of various materials, such as cloth, vinyl, leather, etc. In the present example, the diaper bag 30 includes a pair of carry handles 32 on the top of the bag, but other carry options may also be used in addition to, or instead of, the carry handles, such as a shoulder strap, for example. Furthermore, the diaper bag 30 also illustratively includes a fold out changing pad 33 on a side thereof opposite the medical container compartment 34 (i.e., the fold out changing pad is on the accessory compartment side of the bag). The pad 33 may fold up and be held in place with snaps, hook-and-loop fasteners, etc., and may be sewn or otherwise attached to the outside of the bag 30 to provide a quick and easily storable place to change a child's diaper.

The diaper bag 30 also illustratively includes the medical container compartment 34 for storing one or more rigid medical containers or carriers 35. The accessory or storage compartment 31 and the medical container compartment 34 may be separated by a divider 70 and closed via a zipper 36 or other latching device (e.g., hook-and-loop fastener, snaps, magnets, etc.). By way of example, the rigid medical container 35 may be made of plastic, metal, or other suitable material that will help keep medicines, medical applicators, etc., safe from being damaged or broken as the bag is transported. In accordance with one example embodiment, the rigid medical container 35 may be a colored or clear plastic, or it may be a combination of both (e.g., a clear plastic container with a colored plastic lid). Example color configurations for the rigid medical container 35 will be discussed further below.

Generally speaking, the diaper bag 30 provides a safe and easily accessible location for medications, particularly emergency medications. For example, the diaper bag 30 may advantageously help assist people with medical issues, particularly parents with children that have issues such as asthma and severe allergies (e.g., peanut allergies, etc.). In the case of medically needy children, every second matters when a child is having an allergic reaction or asthma attack, for example. The illustrated diaper bag not only keeps these items safe from damage, but also provides ready access to such medicines and helps keep them at their proper storage temperatures so that they do not lose their efficacy.

More particularly, the medication-holding portion of the diaper bag 30 (i.e., the medical container 35) may be a hard, insulated case with snap-in clips, brackets, straps, elastic bands, hook-and-loop fasteners, etc., that may be customized to hold the particular types of emergency medications and accessories the user requires. The clips (or other securing device) may advantageously allow the medications to pop out easily with one hand while still securing them well enough to not come loose while the diaper bag is being transported. The clips may also be removable and replaceable with other custom clips if the user's medication needs change.

Figure 4:
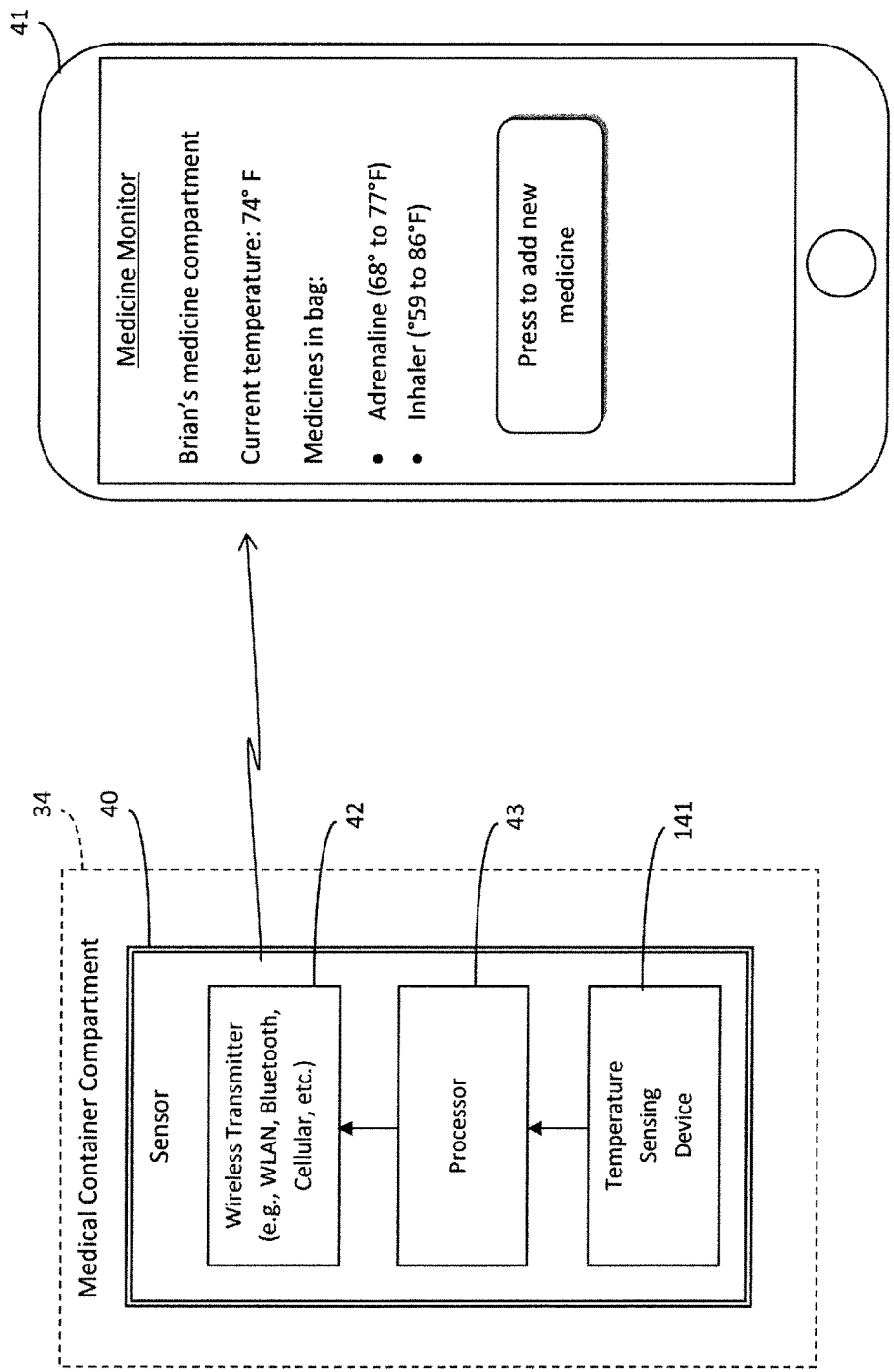
FIG. 4 is a schematic block diagram illustrating the sensor of the carry bag communicating with an associated mobile wireless communications device in accordance with an example embodiment.

In the illustrated example, the diaper bag 30 further illustratively includes a sensor or controller 40 that may advantageously be used to monitor the conditions within the medical container compartment 34, and provide a notification to the user if the conditions within the compartment are outside of an acceptable range for the associated medicines stored therein. In the example illustrated in FIG. 4, the sensor 40 is synchronized with a mobile wireless communications device 41 (here a smartphone) to alert the user if the inside is getting too hot or cold for optimal or safe medication storage. By way of example, an app on the smartphone (or tablet, etc.) may advantageously allow the user to select which types of medicines or other sensitive items are being stored within the rigid medical container. Then, knowing the safe storage range for the various medications, the smartphone 41 may then wirelessly communicate with the sensor 40 to receive temperature updates, and may accordingly provide an alert to the user if the temperature within the medical container compartment 34 goes outside of the prescribed range for one or more of the medicines stored in the rigid medical container.

In the present example, the user has indicated that adrenaline and an asthma inhaler are in the rigid medical container, which in this case respectively have a safe storage range of 68° to 77° F. and 59° to 86° F., respectively. However, it should be noted that different medications (or other temperature sensitive items) and temperature ranges may be used in different embodiments. The sensor 40 illustratively includes a temperature sensing device 141, a wireless communications device 42 (e.g., a WLAN, Bluetooth, cellular, etc., transmitter or transceiver), and a processor 43 (e.g., a microprocessor and associated non-transitory computer-readable medium with computer-executable instructions). The processor 43 advantageously cooperates with the temperature sensing device and the wireless transmitter 42 to read a current temperature within the medical container compartment 34 (e.g., at periodic intervals), and communicate the temperature information to the associated mobile device.

In some embodiments, the mobile device 41 may communicate the safe operating temperature ranges to the processor 43 for the medicine(s) being stored so that the processor may know what the trigger or threshold temperatures are. In this way, the sensor 40 does not need to transmit continuous temperature updates, but instead only needs to send a notification to the mobile device 41 when one of the thresholds has been exceeded, thus allowing the mobile device to alert the user. This may advantageously provide power savings for a battery used to power the sensor (not shown). The battery (or batteries) for the sensor may be rechargeable or disposable in different embodiments. It should be noted that in some embodiments, the sensor 40 may also include an alert device (e.g., an audible alarm device or buzzer) which may be set off in addition to, or instead of, the mobile device alert.

In the illustrated example, the rigid medical container 35 further illustratively includes zippered, mesh bags or pouches 50 that can hold non-emergency medication (or anything else the user desires to transport). Furthermore, holders (e.g., elastic strips or bands) may be included to hold a notepad 51 (or information card) in place. The notepad 51 may advantageously be included to provide dosing information, asthma action plans, emergency phone numbers, and any other pertinent information, in an easily accessible location. Other items that may be included within the rigid medical compartment 35 may include an inhaler spacer 52, inhaler 53, adrenaline injector 54, and an icepack 55 to help keep the sensitive medication within the desired temperature range. The medical container compartment 34 may advantageously be insulated as well to help keep the temperature within the safe storage range for the medicines.

The rest of the diaper bag may also have additional useful features. As noted above, a fold out changing pad 33 may also be provided. In one example embodiment, the changing pad 33 may include two or more snaps at the top that secure the changing pad in place to make it easy for parents to open with only one hand, although other suitable fasteners (e.g., hook-and-loop fasteners) may also be used. The pad may be attached to the bottom of the bag, and may be made of cloth on the bottom, may be padded, and may have vinyl on the top to make it easy to wipe clean. As seen in FIG. 2, once the pad has been opened, it may reveal mesh storage pouches or pockets 60 attached to the outside of the diaper bag 30 (there are two shown in the illustrated example, but different numbers of pockets (or no pockets) may be used in different embodiments. The pockets 60 may be mesh with elastic tops, for example, although other types of materials and arrangements may also be used. The pockets 60 may be sized to hold items such as diapers, travel wipe containers, wipes, creams, ointments, or diaper disposal bags, for example. Pockets may also be positioned on the sides or ends of the bag (not shown), if desired, to provide extra storage. In accordance with one example embodiment, one of the side pockets 60 may be insulated and large enough to fit a bottle in. The interior of the bag may be made of sturdy vinyl for easy cleaning and have one or more pockets to store cell phones, keys, wallets, etc.

Still another feature of the diaper bag 30 is the coloration. In one example embodiment, the rigid medical container 35 (or portion thereof) may be a solid color, while the rest of the bag may be patterned. There may be several color and pattern options, but with the rigid medical container remaining a solid color. The reason for this is to make it very clear which section needs to be accessed during a medical emergency. If a parent is not directly beside their diaper bag when their child needs emergency medication, the parent can clearly communicate to whoever is nearest the bag to open the red (or whatever solid color they have chosen) section and get the needed medication. However, as noted above, the rigid medical compartment may also be clear in different embodiments.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:
1. A system comprising:
a mobile wireless communications device; and
a carry bag comprising
 a pouch having an opening therein,
 at least one divider within the pouch defining a medical container compartment and a storage compartment,
 insulation lining the medical container compartment,
 a temperature sensor carried by the pouch and configured to monitor temperature within the medical container compartment,
 a wireless transceiver carried by the pouch, and a processor carried by the pouch and cooperating with the temperature sensor and the wireless transceiver to send temperature data to the mobile wireless communications device;

wherein the mobile wireless communications device is configured to select at least one medicine from among a plurality of different medicines each having different recommended storage temperature ranges associated therewith, determine a safe temperature range based upon the at least one medicine selected, and generate an alert when the temperature within the medical container compartment is outside of the safe storage temperature range;

wherein the carry bag further comprises at least one pocket on an exterior surface thereof, and a changing pad coupled to the exterior surface of the carry bag that folds to cover the at least one pocket when in a closed position and unfolds to reveal the at least one pocket when in an open position.

2. The system of claim 1 further comprising a rigid medical container sized to fit within the medical container compartment.

3. The system of claim 1 wherein the mobile wireless communications device is further configured to send the safe operating temperature range to the processor, and wherein the processor is configured to only send the temperature data to the mobile wireless communications device when the temperature within the medical container compartment is outside the temperature range.

4. The system of claim 1 wherein the wireless transmitter comprises at least one of a wireless local area network (WLAN) and an ultra-high frequency (UHF) transmitter.

5. The system of claim 1 wherein the processor operates the temperature sensor and the wireless transmitter to read the temperature within the medical container compartment at periodic intervals, and send the temperature information to the mobile wireless communications device based upon the temperature readings.

6. The system of claim 1 wherein the mobile wireless communications device is configured to select a plurality of different medicines and determine the safe temperature range based upon the plurality of different medicines selected.

7. The system of claim 1 wherein the at least one pocket comprises at least one mesh pocket.

8. The system of claim 1 wherein the changing pad comprises cloth on a bottom surface thereof, and vinyl on a top surface thereof.

9. The system of claim 1 wherein the at least one pocket has an elastic top.

10. A system comprising:
a mobile wireless communications device; and
a carry bag comprising
a pouch having an opening therein,
at least one divider within the pouch defining a medical container compartment and a storage compartment,
at least one pocket on an exterior surface of the carry bag opposite the medical container compartment,
a fold out changing pad coupled to the exterior surface opposite the medical container compartment that folds to cover the at least one pocket when in a closed position and unfolds to reveal the at least one pocket when in an open position, a temperature sensor carried by the pouch and configured to monitor temperature within the medical container compartment, a wireless transceiver carried by the pouch, and a processor carried by the pouch and coupled to the temperature sensor and the wireless transceiver;

wherein the mobile wireless communications device is configured to select a plurality of different medicines each having different recommended storage temperature ranges associated therewith, determine a safe temperature range based upon the plurality of different medicines selected, and communicate with the processor via the wireless transceiver and generate an alert when the temperature within the medical container compartment is outside of the safe storage temperature range.

11. The system of claim 10 further comprising a rigid medical container sized to fit within the medical container compartment.

12. The system of claim 10 wherein the mobile wireless communications device is further configured to send the safe operating temperature range to the processor, wherein the processor is configured to send temperature data to the mobile wireless communications device when the temperature within the medical container compartment is outside the temperature range, and wherein the mobile wireless communications device generate the alert based upon the received temperature data.

13. The system of claim 10 wherein the wireless transmitter comprises at least one of a wireless local area network (WLAN) and an ultra-high frequency (UHF) transmitter.

14. The system of claim 10 wherein the processor operates the temperature sensor and the wireless transmitter to read the temperature within the medical container compartment at periodic intervals, and send temperature information to the mobile wireless communications device based upon the temperature readings.

15. A method for transporting medicines using a carry bag comprising a pouch having an opening therein, at least one divider within the pouch defining a medical container compartment and a storage compartment, a temperature sensor carried by the pouch and configured to monitor temperature within the medical container compartment, and a wireless transceiver carried by the pouch, and a processor coupled to the temperature sensor and the wireless transceiver, the method comprising:

at a mobile wireless communications device, selecting at least one medicine from among a plurality of different medicines each having different recommended storage temperature ranges associated therewith, determining a safe temperature range based upon the at least one medicine selected, and wirelessly communicating with the processor via the transceiver and generating an alert when the temperature within the medical container compartment is outside of the safe storage temperature range;

wherein the carry bag further comprises at least one pocket on an exterior surface thereof, and a changing pad coupled to the exterior surface of the carry bag that folds to cover the at least one pocket when in a closed position and unfolds to reveal the at least one pocket when in an open position.

16. The method of claim 15 wherein the carry bag further comprises a rigid medical container sized to fit within the medical container compartment.

17. The method of claim 15 further comprising:
sending the safe operating temperature range to the processor from the mobile wireless communications device; and
sending temperature data from the processor to the mobile wireless communications device when the temperature within the medical container compartment is outside the temperature range.

18. The method of claim 15 wherein the wireless transmitter comprises at least one of a wireless local area network (WLAN) and an ultra-high frequency (UHF) transmitter.

19. The method of claim 15 further comprising operating the temperature sensor and the wireless transmitter to read the temperature within the medical container compartment at periodic intervals, and sending temperature information to the mobile wireless communications device from the processor based upon the temperature readings.

20. The method of claim 15 wherein selecting comprises selecting a plurality of different medicines, and wherein determining comprises determining the safe temperature range based upon the plurality of different medicines selected.

* * * * *